US012609022B2

(12) United States Patent
Bieger

(10) Patent No.: US 12,609,022 B2
(45) Date of Patent: Apr. 21, 2026

(54) METHOD AND SYSTEM FOR ASSESSING THE CORRECTNESS OF INFORMATION TRANSMITTED BY A VEHICLE

(71) Applicant: Continental Automotive Technologies GmbH, Hannover (DE)

(72) Inventor: Stefan Bieger, Nidda (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 131 days.

(21) Appl. No.: 17/927,585

(22) PCT Filed: Mar. 8, 2021

(86) PCT No.: PCT/EP2021/055806
§ 371 (c)(1),
(2) Date: Nov. 23, 2022

(87) PCT Pub. No.: WO2021/239282
PCT Pub. Date: Dec. 2, 2021

(65) Prior Publication Data
US 2023/0206751 A1     Jun. 29, 2023

(30) Foreign Application Priority Data

May 28, 2020     (DE) ...................... 10 2020 206 702.3

(51) Int. Cl.
*G08G 1/01*          (2006.01)
*G08G 1/017*         (2006.01)
*H04W 4/44*          (2018.01)

(52) U.S. Cl.
CPC ......... *G08G 1/0125* (2013.01); *G08G 1/0112* (2013.01); *G08G 1/0116* (2013.01); *G08G 1/017* (2013.01); *H04W 4/44* (2018.02)

(58) Field of Classification Search
CPC .. G08G 1/0125; G08G 1/0112; G08G 1/0116; G08G 1/017; G08G 1/0175;
(Continued)

(56) References Cited

U.S. PATENT DOCUMENTS 8,923,147 B2 * 12/2014 Krishnaswamy ...........................
                                            H04W 56/0035
                                                   370/252
9,531,737 B2 * 12/2016 Stählin .................... G06F 21/33
(Continued)

FOREIGN PATENT DOCUMENTS

CN          101650873 A      2/2010
CN          107430591 A      12/2017
(Continued)

OTHER PUBLICATIONS

DE102015221184 machine translation (Year: 2015).*
(Continued)

*Primary Examiner* — Fadey S. Jabr
*Assistant Examiner* — Mark Robert Heim

(57)          ABSTRACT

The correctness of information transmitted by a vehicle is assessed. Vehicle information about vehicle characteristics of a vehicle is received, wherein a vehicle trust value is assigned to the vehicle. Detector information about the vehicle characteristics is received, which is based on a detection of the vehicle characteristics by at least one detector outside the vehicle, wherein a detector trust value is assigned to the detector. Then, the correctness of the vehicle information is assessed. A correctness value is assigned to the vehicle information, and the vehicle trust value is updated. The vehicle information may be discarded when the correctness value is too low. Vehicles with a high trust value may validate other vehicles, which may in turn vali- (Continued)

date even more vehicles. In this way, a chain of vehicles with a high trust value (or trusted vehicles) may be established.

21 Claims, 2 Drawing Sheets

(58) Field of Classification Search
CPC ............ G08G 1/04; H04W 4/40; H04W 4/44; H04W 12/108
See application file for complete search history.

(56) References Cited

U.S. PATENT DOCUMENTS

| | | | | |
|---|---|---|---|---|
| 2010/0019891 A1* | 1/2010 | Mudalige | ............... | G08G 1/167 |
| | | | | 340/425.5 |
| 2010/0250727 A1 | 9/2010 | King | | |
| 2012/0159156 A1 | 6/2012 | Barham | | |
| 2013/0083679 A1* | 4/2013 | Krishnaswamy | ...... | G08G 1/093 |
| | | | | 370/252 |
| 2013/0251150 A1 | 9/2013 | Chassagne | | |
| 2017/0200370 A1* | 7/2017 | Miller | .................... | G08G 1/162 |
| 2018/0001890 A1* | 1/2018 | Ratcliffe | ............... | B60W 50/14 |
| 2018/0068559 A1* | 3/2018 | Bjersing | ............ | G08G 1/09675 |
| 2018/0262694 A1 | 9/2018 | Lee | | |
| 2020/0139980 A1* | 5/2020 | Liu | ........................ | B60W 30/12 |
| 2020/0280842 A1* | 9/2020 | Liu | ........................ | H04L 9/3268 |
| 2020/0314089 A1* | 10/2020 | Iasynetskyi | ............. | G06F 21/33 |
| 2021/0284193 A1* | 9/2021 | Jenzowsky | .......... | G06V 20/588 |

| | | | | |
|---|---|---|---|---|
| 2023/0300616 A1* | 9/2023 | Petit | .................... | H04W 12/108 |
| | | | | 726/22 |
| 2024/0284152 A1* | 8/2024 | Puller | ...................... | H04W 4/40 |
| 2024/0412626 A1* | 12/2024 | Kim | ........................ | G08G 1/017 |

FOREIGN PATENT DOCUMENTS

| | | | | |
|---|---|---|---|---|
| CN | 108597245 A | | 9/2018 | |
| DE | 102015221184 A1 * | | 5/2017 | |
| DE | 102017113005 A1 * | | 12/2018 | |
| EP | 2583117 A1 | | 4/2013 | |
| EP | 2656270 A2 | | 10/2013 | |
| WO | WO-2019219419 A1 * | | 11/2019 | ............... G01S 7/40 |
| WO | WO-2020075839 A1 * | | 4/2020 | |

OTHER PUBLICATIONS

Allig et al. Trustworthiness Estimation of Entities within Collective Perception (Year: 2019).*
DE-102017113005-A1 machine translation (Year: 2018).*
WO-2020075839-A1 machine translation (Year: 2020).*
Christoph Allig et al. "Trustworthiness Estimation of Entities within Collective Perception", 2019 IEEE Vehicular Networking Conference (VNC), IEEE, 2019.
Office Action dated Apr. 12, 2021 from corresponding German patent application No. 10 2020 206 702.3.
International Search Report and Written Opinion dated Apr. 22, 2021 from corresponding International patent application No. PCT/EP2021/055806.
CN Office action dated Aug. 1, 2024 of countepart Chinese application No. 202180035546.9.

* cited by examiner

US 12,609,022 B2

1

METHOD AND SYSTEM FOR ASSESSING THE CORRECTNESS OF INFORMATION TRANSMITTED BY A VEHICLE

BACKGROUND

A vehicle may send information about its location, the position of the brakes, whether it is experiencing aquaplaning etc. to a central server. That server may send that information to other vehicles that are in the vicinity of that vehicle, such that the other vehicles may use that information, for example for anticipating the behavior of that vehicle or for anticipating road conditions.

In order to prevent abuse, the communication between the vehicle and the central server is encrypted and signed. However, if an attacker would have access to computer systems of the car, he could falsify, fake or manipulate the information—for example GPS information—that is then sent to the central server. In that way, he could send incorrect information to the central server, which will distribute the incorrect information to the other vehicles. This may cause dangerous situations for these other vehicles.

The objective of the invention is therefore to reduce the risks of distributing incorrect or false information.

BRIEF SUMMARY

The objective of the invention is met by providing a method and a remote server according to the independent claims.

According to a first aspect of the invention a method is provided for assessing the correctness of information transmitted by a vehicle, comprising the steps of:

receiving vehicle information about vehicle characteristics of a vehicle, wherein a vehicle trust value is assigned to said vehicle;

receiving detector information about said vehicle characteristics, which is based on a detection of said vehicle characteristics by at least one detector outside said vehicle, wherein a detector trust value is assigned to said detector;

assessing the correctness of said vehicle information based on said vehicle information, said vehicle trust value, said detector information, and/or said detector trust value;

assigning a correctness value to said vehicle information based on said assessment;

update the vehicle trust value based on said vehicle information, said vehicle trust value, said detector information, and/or said detector trust value; and, processing said vehicle information using said correctness value.

In one of more embodiments, a vehicle is one of a group comprising a car, a motorbike, a van, a truck, a bicycle, and a scooter.

In one of more embodiments, said vehicle characteristics comprise at least one of a group comprising: a GPS position, a velocity, an acceleration, an outside weather condition, a stop time before a traffic light, a color, and a license plate number of said vehicle. In one of more embodiments, information about an outside weather condition may comprise information about the use of the windscreen wiper, an outside temperature, the use of the fog lights, and/or a (sun) light intensity.

In one or more embodiments, any of said vehicle characteristics may be detected by one or more sensors on board of the vehicle. A color, a license plate, or a vehicle identification number may not need to be detected by one or more sensors on board of the vehicle. However, in case of a malicious attacker, information about any of these vehicle characteristics may be falsified.

Therefore, in one or more embodiments, the correctness of the information about these characteristics—provided by the vehicle—is compared with information about these same characteristics provided by other entities or detectors, such as vehicles in the vicinity of the vehicle or a roadside unit, such as a traffic light or a traffic sign.

In one or more embodiments, this roadside unit may comprise a sensor, such as a camera, which is arranged for detecting one or more vehicle characteristics.

The correctness of said vehicle information is assessed based on said vehicle information and said detector information. However, the detector and/or the vehicle may have provided incorrect information about one or more of said characteristics in the past. The detected and/or the vehicle may have been attacked before or is malfunctioning.

Therefore, a trust value is assigned to both the vehicle and the detector. In general, a higher trust value indicates that the information provided is more trustworthy or is more often correct. In one or more embodiment, the trust value may be a value between 0 and 100, wherein 100 is the highest trust value.

In one or more embodiments, the vehicle trust value comprises vehicle characteristic trust values, corresponding to the respective vehicle characteristic for which information is comprised in the vehicle information. This may reflect the trustworthiness of individual sensors of the vehicle.

In one or more embodiments, the detector trust value comprises detector characteristic trust values, corresponding to the respective vehicle characteristic for which information is comprised in the detector information. This may reflect the trustworthiness of individual sensors of the detector.

In one or more embodiments, certain detectors such road camera may have the highest trust value because they are operated and maintained by an official body or state organization. Therefore, such road camera may have a trust value of 100.

Therefore, assessing the correctness of the vehicle information is also based on the vehicle trust value and the detector trust value. Based on this assessment a correctness value is assigned to the vehicle information. In general, a higher correctness value indicates that the information provided is more likely to be correct. In one or more embodiment, the correctness value may be a value between 0 and 100, wherein 100 is the highest correctness value.

For example, when the vehicle information does not correspond with the detector information regarding a certain vehicle characteristic and the vehicle trust value is low and the detector trust value is high, the correctness value will be low.

In another example, when the vehicle information corresponds with the detector information regarding a certain vehicle characteristic within a predetermined margin and both the vehicle trust value and the detector trust value is high (for example both 100), the correctness value will be high (for example 100).

According to the invention, said vehicle information is processed using said correctness value. In one or more embodiments, vehicle information with a correctness value above a predefined threshold may be processed to generate information for other vehicles in the vicinity of the vehicle.

In one or more embodiments, the vehicle information will be discarded when said correctness value is below another predetermined threshold. In that case, the risk of distributing incorrect information is reduced.

In order to have a trust value that reflects the current trustworthiness of the vehicle, the vehicle trust value may be updated or adjusted based on said vehicle information, said detector information, and/or said detector trust value. In practice, a high correctness value may result in an increased trust value.

In one or more embodiments, the detector trust value may be adjusted based on said correctness value. In practice, a high correctness value may result in an increased trust value.

In one or more embodiments, the detector is another vehicle with a sensor or a roadside unit with a sensor, wherein preferably said vehicle is within a detection range of the respective sensor.

In one or more embodiments, the trust value (of the vehicle and/or of the detector) is updated or adjusted at a predefined time interval after the previous adjustment. It may be the case, that the trust value has not been updated for a long time, for example for 6 months, or for 12 months, or for 36 months.

The probability that a vehicle or detector may send incorrect information because of an attack or malfunctioning will increase over time. Therefore, it is advantageous to periodically adjust, i.e. lower, the trust value. In one or more embodiments, the vehicle trust value may be set to a default trust value each time the vehicle is switched on or started. The probability that a detector may send incorrect information is relatively low, so said predefined time interval may be set to 6 months, 12 months or 36 months.

In one or more embodiments, the method may further comprise the step of identifying said vehicle. In that step, it is established that the vehicle information and the detector information both relate to the same vehicle. In one or more embodiments, the vehicle is identified based on information about the license plate number that is comprised in both the vehicle information and the detector information. In one or more embodiments, the vehicle is identified based on information about a light sequence of one of more vehicle lights of said vehicle.

In one or more embodiments, the vehicle activates one of more vehicle lights according to a predetermined light sequence and information about this predetermined light sequence is comprised in said vehicle information. In one or more other embodiments, information about a predetermined light sequence is first sent to the vehicle, which in response activates one of more vehicle lights according to said predetermined light sequence.

In one or more embodiments, a light sequence emitted by the one or more vehicle lights of the vehicle is detected by the detector, and the detector information comprises information about the detected light sequence.

In these embodiments, the vehicle is identified based on a comparison of information about said predetermined light sequence with information about said detected light sequence.

In one or more embodiments, the method may further comprise providing a session-key to the vehicle, wherein the vehicle information comprises said session key. The session-key may be used for identifying the vehicle. In one or more embodiment, a new session key is provided to the vehicle each time the vehicle is switched on or started. In one or more embodiment, said session key is exchanged between the vehicle and the remote server.

In one or more embodiments, the method further comprises the step of sending information relating to said vehicle information to other vehicles in the vicinity of said vehicle when said correctness value is above a predetermined threshold.

In one or more embodiments, the method further comprises the step of sending said vehicle information with said correctness value to other vehicles in the vicinity of said vehicle. In that case, the computer on board of the vehicles in the vicinity may assess the correctness value and based on that assessment, may process or discard the vehicle information.

In one or more embodiments, the wording "vehicles in the vicinity" relates to vehicles other than said vehicle that are in a range with respect to said vehicle, such that information about said vehicle is relevant for driving these vehicles. For example, that a vehicle is braking may be relevant for other vehicles behind it.

In another aspect of the invention, a method for establishing a chain of vehicles with updated vehicle trust values, comprising repeating a cycle, wherein said cycle comprises the steps of any of the embodiments described in this document and wherein said detector in cycle n is said vehicle with an updated vehicle trust value assigned to in cycle n−1. In this, n is an integer with value of 1 or higher. In one or more embodiments, the detector in the first cycle is a roadside unit with a high or the highest detector trust value, for example with a detector trust value of 100. By repeating the cycle, a chain of vehicles with a high vehicle trust value may be established.

In another aspect of the invention, a remote server is provided for assessing the correctness of information transmitted by a vehicle, wherein the remote server is arranged for executing the steps of any embodiment of the method as described in this document. The wording "remote server" relates to a computer outside of said vehicle. In one or more embodiments, the remote server is located in a computing center.

In another aspect of the invention, a computer program is provided comprising instructions which, when the program is executed by a computer, cause the computer to carry out the steps of any embodiment of the method as described in this document. In yet another aspect, a computer-readable medium is provided having stored thereon such a computer program.

The working, advantages, and embodiments of the remote server and the system, as well as the working, advantages, and embodiments of the computer program and computer-readable medium, correspond with the working, advantages, and embodiments of the method as described in this document, mutatis mutandis.

BRIEF DESCRIPTION OF THE DRAWINGS

For a more complete understanding of the present invention, reference in the following description is made to the accompanying drawings.

DETAILED DESCRIPTION

Figure 1:
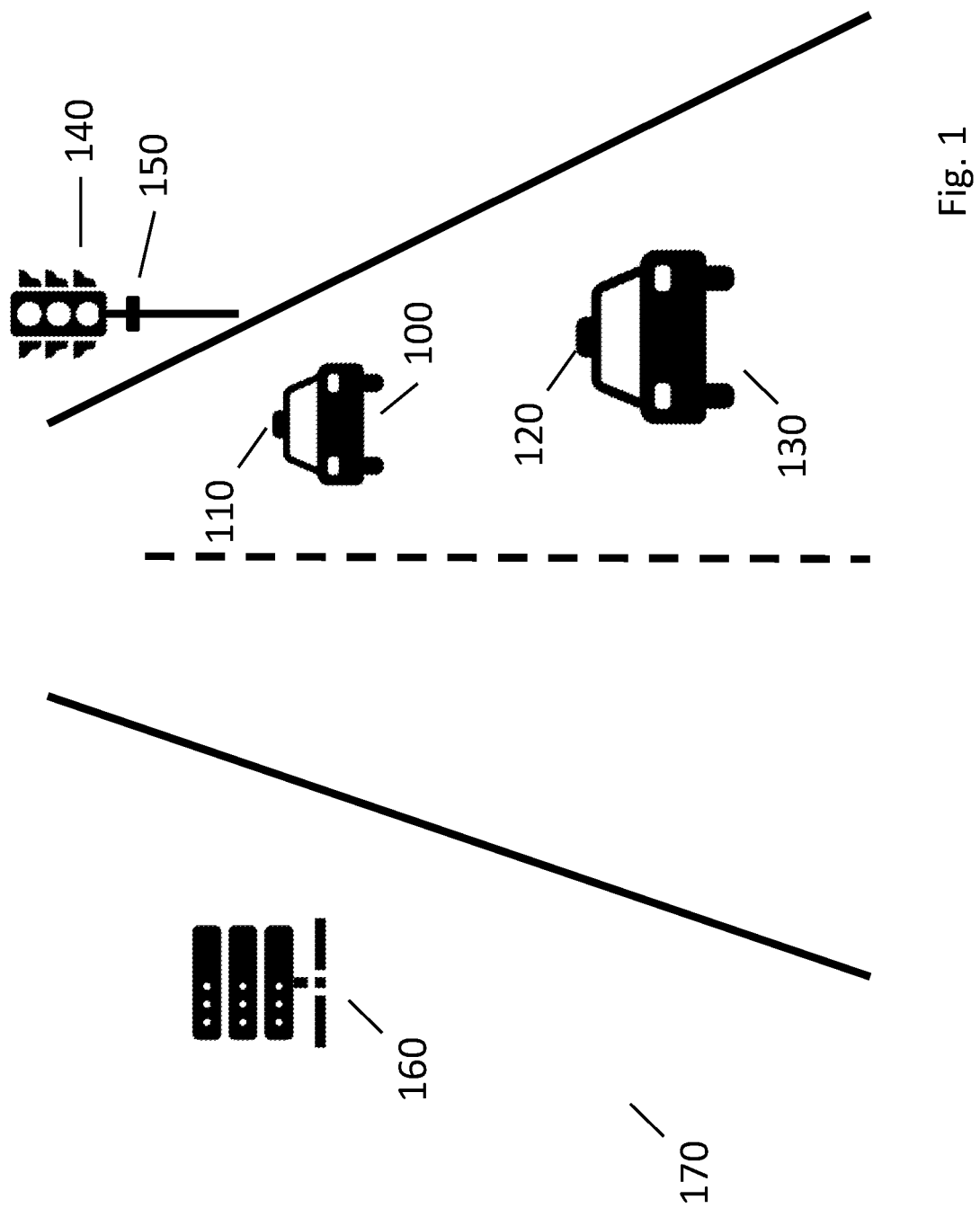
FIG. 1 shows a schematic overview of a system comprising a remote server and a detector according to one or more embodiments of the invention.

FIG. 1 shows a schematic overview of a system 170 comprising a remote server 160 and a detector (120, 150) according to one or more embodiments of the invention.

In one or more embodiments, vehicle 100 may have received a session-key, for example when it was started or switched on.

Vehicle 100 is driving on a road. It is sending vehicle information about vehicle characteristics of the vehicle 100 to remote server 160. The vehicle characteristics may comprise a GPS position, a velocity, an acceleration, a stop time for a traffic light, an outside weather condition, a vehicle color, and/or a license plate number of said vehicle. In one or more embodiments, the vehicle information may also comprise information about the operation of the car, by the driver or an assisted driving system, for example information about the use of the brakes, the windscreen wiper, etc. One or more vehicle characteristics may be detected by a detector 110 on board of vehicle 100.

In one or more embodiments, remote server 160 is arranged for receiving said vehicle information about a vehicle characteristic of vehicle 100.

Information about these vehicle characteristics may be relevant for other vehicles in the vicinity of vehicle 100, such as vehicle 130. For example, when vehicle 100 is suddenly slowing down (i.e. having a negative acceleration), vehicle 130 may want to start with slowing down immediately.

In case of a malicious attacker, information about these characteristics may be falsified. For example, a hacker may use components of a scrap car, which is still able to send vehicle information to the remote server 160 using the correct encryption and signature, in order to falsify vehicle information.

Therefore, in one or more embodiments, the correctness of the information about these characteristics provided by the vehicle is compared with information about these same characteristics provided by other entities or detectors, such as a vehicle 130 in the vicinity of the vehicle 100 or roadside unit 140, such as a traffic light 140.

In one or more embodiments, a detector comprises a sensor. For example, vehicle 130 may comprise sensor 120 and/or traffic light 140 may comprise sensor 150.

In one or more embodiments, such sensor may be one of a group comprising a camera, a LIDAR, a RADAR, a GPS module, a microphone, a temperature sensor, and a humidity sensor.

In one or more embodiments, the detector sends detector information about vehicle characteristics to remote server 160. For example, vehicle 130 and/or traffic light 140 may use their sensor 120, 150 to measure the acceleration of vehicle 100, to detect its license plate number, and/or to estimate the GPS location of vehicle 100.

In one or more embodiment, the detector information and/or the vehicle information may comprise identity information of vehicle 100, such as the session key, a license plate number, a GPS position, make/model information, and/or color information. The identity information may further comprise a vehicle velocity, a vehicle acceleration, and/or a timestamp. The timestamp may indicate when one or more characteristic were measured.

The identity information may further comprise information about the surroundings of the vehicle and the detector respectively. When this information corresponds with each other, it may indicate that the vehicle is in the vicinity of the detector. This may be used when assessing the correctness of the vehicle information relating to the GPS position of the vehicle. Information about the surroundings may comprise information about the wireless networks or radio signals that are received by the vehicle and/or the detector.

In one or more embodiments, based on the identity information in the detector information and/or in the vehicle information, vehicle 110 may be identified, i.e. it is established that the detector information and the vehicle information both relate to the same vehicle.

To the providers of the detector information and the vehicle information, i.e. the vehicle 100 and the detector 130, 140, a trust value may be assigned, which indicates how trustworthy the information they provide is regarded. For example, a detector trust value may be 100, indicating that the information this detector provides is regarded as always correct. A vehicle trust value may be 50, which may indicate that its trustworthiness has not been assessed before and that, therefore, there is a 50% chance that its information is correct, and a 50% chance that its information is incorrect.

In one or more embodiments, the vehicle trust value comprises vehicle characteristic trust values, corresponding to the respective vehicle characteristic for which information is comprised in the vehicle information. In one or more embodiments, the vehicle trust value comprises vehicle characteristic trust values, corresponding to the respective vehicle characteristic for which information is comprised in the vehicle information. This may reflect the trustworthiness of information about individual vehicle characteristic or, indeed, the trustworthiness of sensors inside the vehicle that measure or determine said individual vehicle characteristic. For example, the acceleration sensor in a vehicle may be accurate, while the windscreen wiper of that vehicle may be malfunctioning.

In one or more embodiments, the detector trust value comprises detector characteristic trust values, corresponding to the respective vehicle characteristic for which information is comprised in the detector information. This may reflect the trustworthiness of the sensors of the detector, as explained with respect to the vehicle trust value.

Remote server 160 may then assess the correctness of the vehicle information, using said vehicle information, said vehicle trust value, said detector information and/or said detector trust value. Based on this assessment a correctness value is assigned to said vehicle information.

Based on the vehicle information, a vehicle characteristic may be calculated or determined. Based on the detector information, the same vehicle characteristic may be calculated or determined. Because of sensor inaccuracies, it may be expected that there is often a difference between the vehicle characteristic determined based on the vehicle information and the vehicle characteristic determined based on the detector information.

In one or more embodiment, when this difference is below a predetermined value, the vehicle characteristic determined based on the vehicle information and the vehicle characteristic determined based on the detector information are considered to be equal.

In one or more embodiments, a correctness value of 100 may indicate that there is a 100% chance that the vehicle information is correct. In one or more embodiments, a correctness value of 50 may indicate that there is a 50% chance that the vehicle information is correct and a 50% chance that its information is incorrect. In one or more embodiments, a correctness value of 0 may indicate that the chance the vehicle information is incorrect, is 100%.

In one or more embodiments, based on the correctness value the vehicle information may be discarded, when the correctness value is below a predetermined threshold. In one or more embodiments, the remote server 160 is arranged for discarding the vehicle information, when the correctness value is below a predetermined threshold.

In one or more embodiments, when the correctness value is above another predetermined threshold, the vehicle information may be processed, for example in the remote server 160, to generate information for the other vehicles 110 in the vicinity of vehicle 100.

In one or more embodiments, when the correctness value is between the above mentioned two thresholds, the vehicle information may be processed, for example in the remote server 160, together with other vehicle information from other vehicles, wherein vehicle information is processed using a respective weighting factor, that is based on its correctness value.

Based on said vehicle information, said vehicle trust value, said detector information, and/or said detector trust value, the vehicle trust value may be adjusted or updated. In one or more embodiment, after providing one or more times vehicle information with a high correctness value, a vehicle may be considered more trustworthy than before. Therefore, its vehicle trust value may be adjusted, i.e. increased. In one or more embodiments, the remote server 160 is arranged for updating the vehicle trust value and/or the detector trust value.

In one or more embodiments, one or more detectors 130, 140, with a high trust value assigned to them, may validate vehicle 100, i.e. causing it to have a high trust value assigned to it, when a high correctness value, for example 100, is (once, often, or a predetermined number of times) assigned to the information the vehicle has provided. In this way, vehicles with a high trust value may validate other vehicles, which may in turn validate even more vehicles. In this way, a chain of vehicles 100 with a high trust value (or trusted vehicles) may be established.

In one or more embodiment, a chain of vehicles with updated vehicle trust values may be established by repeating a cycle comprising the steps as described in this document. In any cycle n, the detector is the vehicle with an updated vehicle trust value assigned to in the previous cycle (n−1).

In one or more embodiments, it may be the case that most of the vehicles 130 and detector 140 in a pre-defined region will have a high trust value, because it may be expected that most of the vehicles 130 and detector 140 have not been attacked nor have broken sensors. These vehicles and/or detectors will continuously validate each other. Also, it will result in that the correctness value of the vehicle information of a new vehicle 100 in that region will be quickly assessed and that the vehicle 100 will quickly be assigned an appropriate trust value.

When a vehicle trust value has not been updated for a predefined time period after the latest update, it may be advantageous to update the trust value (without a new correctness value), i.e. lowering the trust value. Indeed, after some time, the chances increase that the vehicle has been attacked.

In one or more embodiments, the vehicle 100 is assigned a default trust value each time the vehicle is started or switched on, or enters a region for which remote server 160 is managing the received vehicle information.

Figure 2:
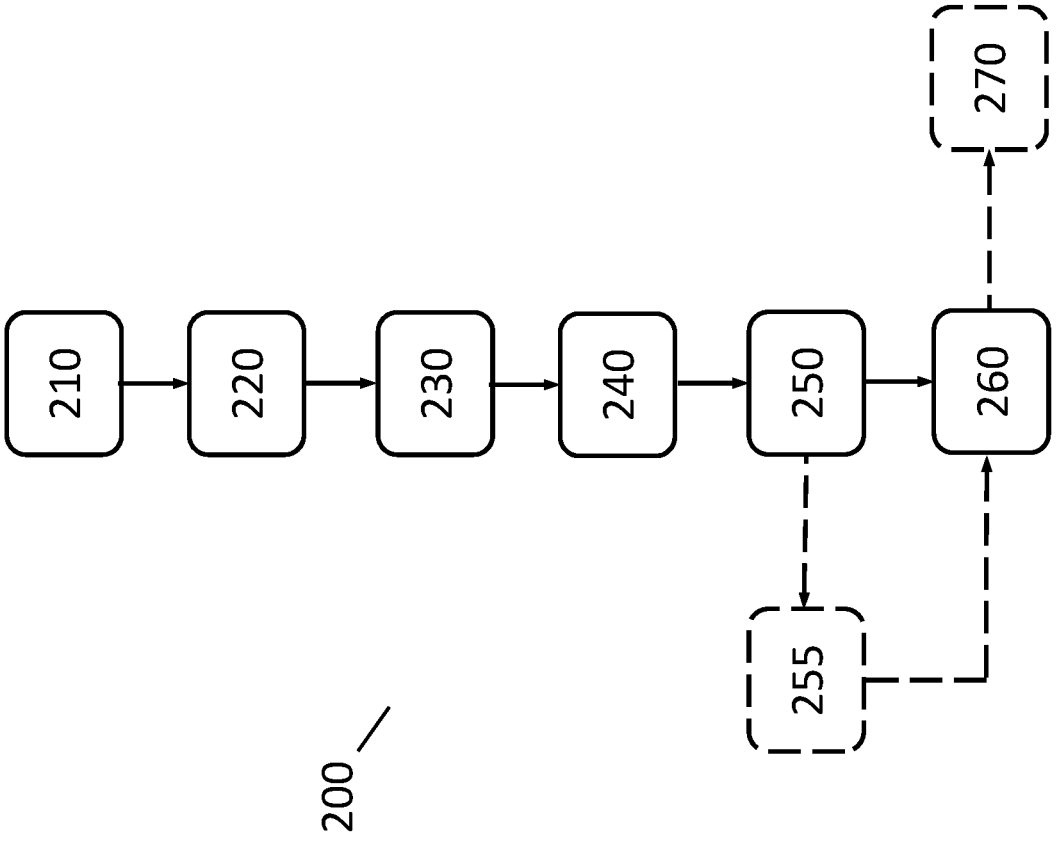
FIG. 2 shows a schematic overview of a method according to one or more embodiments of the invention.

FIG. 2 shows a schematic overview of a method according to one or more embodiments of the invention. The method 200 comprises the following steps:

Step 210: receiving vehicle information about vehicle characteristics of a vehicle, wherein a vehicle trust value is assigned to said vehicle;

Step 220: receiving detector information about said vehicle characteristics, which is based on a detection of said vehicle characteristics by at least one detector outside said vehicle, wherein a detector trust value is assigned to said detector;

Step 230: assessing the correctness of said vehicle information based on said vehicle information, said vehicle trust value, said detector information and/or said detector trust value;

Step 240: assigning a correctness value to said vehicle information based on said assessment;

Step 250: update the vehicle trust value based on said vehicle information, said vehicle trust value, said detector information, and/or said detector trust value; and, Step 260: processing using said vehicle information.

In one or more embodiments, the method 100 may further comprise the steps of:

Step 270: sending information relating to said vehicle information to other vehicles in the vicinity of said vehicle when said correctness value is above said predetermined threshold; and/or Step 255: sending said vehicle information with said correctness value to other vehicles in the vicinity of said vehicle.

In another aspect of the invention, a computer program is provided comprising instructions which, when the program is executed by a computer, cause the computer to carry out the steps of any embodiment of the method as described in this document. In yet another aspect, a computer-readable medium is provided having stored thereon such a computer program.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. A method for establishing a chain of vehicles with updated vehicle trust values, comprising repeating a cycle, wherein said cycle comprises:

receiving vehicle information about vehicle characteristics of a first vehicle, wherein a vehicle trust value is assigned to said first vehicle;

receiving detector information about said vehicle characteristics, which is based on a detection of said vehicle characteristics by at least one detector outside said first vehicle, wherein a detector trust value is assigned to said detector;

assessing the correctness of said vehicle information based on said vehicle information, said vehicle trust value, said detector information, and/or said detector trust value;

assigning a correctness value to said vehicle information based on said assessment;

update the vehicle trust value based on said vehicle information, said vehicle trust value, said detector information, and/or said detector trust value;

identifying said first vehicle, wherein said identifying comprises:

sending information about a predetermined light sequence to said first vehicle, wherein said predetermined light sequence activates one or more vehicle lights of said first vehicle in accordance with said predetermined light sequence;

wherein said detector information comprises information about a light sequence of one of more vehicle lights detected by said detector;

identifying said first vehicle based on a comparison of said predetermined light sequence with said detected light sequence; and processing said vehicle information using said correctness value, wherein said detector in a cycle n is said first vehicle with an updated vehicle trust value assigned to the first vehicle in cycle n−1 and wherein said detector in a cycle n+1 is a second vehicle such that an ability of the second vehicle to be the detector in cycle n+1 depends upon an ability of the first vehicle to be the detector in cycle n;

wherein said detector in the cycle n−1 is a roadside unit with a high detector trust value.

2. The method according to claim 1, wherein said vehicle characteristics comprise at least one of a group comprising: a GPS position, a velocity, an acceleration, a stop time before a traffic light, an outside weather condition, a vehicle color, and a license plate number of said first vehicle.

3. The method according to claim 1, further comprising updating the vehicle trust value at a predefined time interval after the previous update.

4. The method according to claim 1, wherein the vehicle trust value comprises vehicle characteristic trust values, corresponding to the respective vehicle characteristic for which information is comprised in the vehicle information.

5. The method according to claim 1, wherein the detector trust value comprises detector characteristic trust values corresponding to the respective vehicle characteristic for which information is comprised in the detector information.

6. The method according to claim 1, further comprising the step of sending information relating to said vehicle information to other vehicles in the vicinity of said first vehicle when said correctness value is above a predetermined threshold.

7. The method according to claim 1, further comprising the step of sending said vehicle information with said correctness value to other vehicles in the vicinity of said first vehicle.

8. A remote server for establishing a chain of vehicles with updated vehicle trust values, comprising repeating a cycle, wherein said cycle comprises:

receiving vehicle information about vehicle characteristics of a first vehicle, wherein a vehicle trust value is assigned to said first vehicle;

receiving detector information about said vehicle characteristics, which is based on a detection of said first vehicle characteristics by at least one detector outside said first vehicle, wherein a detector trust value is assigned to said detector;

assessing the correctness of said vehicle information based on said vehicle information, said vehicle trust value, said detector information, and/or said detector trust value;

assigning a correctness value to said vehicle information based on said assessment;

update the vehicle trust value based on said vehicle information, said vehicle trust value, said detector information, and/or said detector trust value;

identifying said first vehicle, wherein said identifying comprises:

sending information about a predetermined light sequence to said first vehicle, wherein said predetermined light sequence activates one or more vehicle lights of said first vehicle in accordance with said predetermined light sequence;

wherein said detector information comprises information about a light sequence of one of more vehicle lights detected by said detector;

identifying said first vehicle based on a comparison of said predetermined light sequence with said detected light sequence; and processing said vehicle information using said correctness value;

wherein said detector in a cycle n is said first vehicle with an updated vehicle trust value assigned to the first vehicle in cycle n−1 and wherein said detector in a cycle n+1 is a second vehicle such that an ability of the second vehicle to be the detector in cycle n+1 depends upon an ability of the first vehicle to be the detector in cycle n;

wherein said detector in the cycle n−1 is a roadside unit with a high detector trust value.

9. A system for assessing the correctness of information transmitted by a vehicle, comprising:

a remote server for assessing the correctness of information transmitted by a first vehicle, arranged for establishing a chain of vehicles with updated vehicle trust values, comprising repeating a cycle, wherein said cycle comprises:

receiving vehicle information about vehicle characteristics of a first vehicle, wherein a vehicle trust value is assigned to said first vehicle;

receiving detector information about said vehicle characteristics, which is based on a detection of said vehicle characteristics by at least one detector outside said first vehicle, wherein a detector trust value is assigned to said detector;

assessing the correctness of said vehicle information based on said vehicle information, said vehicle trust value, said detector information, and/or said detector trust value;

assigning a correctness value to said vehicle information based on said assessment;

update the vehicle trust value based on said vehicle information, said vehicle trust value, said detector information, and/or said detector trust value;

identifying said first vehicle, wherein said identifying comprises:

sending information about a predetermined light sequence to said first vehicle, wherein said predetermined light sequence activates one or more vehicle lights of said vehicle in accordance with said predetermined light sequence;

wherein said detector information comprises information about a light sequence of one of more vehicle lights detected by said detector;

identifying said first vehicle based on a comparison of said predetermined light sequence with said detected light sequence; and processing said vehicle information using said correctness value;

said detector outside said first vehicle arranged for detecting said vehicle characteristics of said first vehicle and sending detector information about said detected vehicle characteristics by said detector to said remote server;

wherein said detector in a cycle n is said first vehicle with an updated vehicle trust value assigned to the first vehicle in cycle n−1 and wherein said detector in a cycle n+1 is a second vehicle such that an ability of the second vehicle to be the detector in cycle n+1 depends upon an ability of the first vehicle to be the detector in cycle n;

wherein said detector in the cycle n−1 is a roadside unit with a high detector trust value.

10. The remote server according to claim 8, wherein said vehicle characteristics comprise at least one of a group comprising: a GPS position, a velocity, an acceleration, a stop time before a traffic light, an outside weather condition, a vehicle color, and a license plate number of said first vehicle.

11. The remote server according to claim 8, further configured to update the vehicle trust value at a predefined time interval after the previous update.

12. The remote server according to claim 8, wherein the vehicle trust value comprises vehicle characteristic trust values, corresponding to the respective vehicle characteristic for which information is comprised in the vehicle information.

13. The remote server according to claim 8, wherein the detector trust value comprises detector characteristic trust values corresponding to the respective vehicle characteristic for which information is comprised in the detector information.

14. The remote server according to claim 8, further configured to send information relating to said vehicle information to other vehicles in the vicinity of said first vehicle when said correctness value is above a predetermined threshold.

15. The remote server according to claim 8, further configured to send said vehicle information with said correctness value to other vehicles in the vicinity of said first vehicle.

16. The system according to claim 9, wherein said vehicle characteristics comprise at least one of a group comprising: a GPS position, a velocity, an acceleration, a stop time before a traffic light, an outside weather condition, a vehicle color, and a license plate number of said first vehicle.

17. The system according to claim 9, further configured to update the vehicle trust value at a predefined time interval after the previous update.

18. The system according to claim 9, wherein the vehicle trust value comprises vehicle characteristic trust values, corresponding to the respective vehicle characteristic for which information is comprised in the vehicle information.

19. The system according to claim 9, wherein the detector trust value comprises detector characteristic trust values corresponding to the respective vehicle characteristic for which information is comprised in the detector information.

20. The system according to claim 9, further configured to send information relating to said vehicle information to other vehicles in the vicinity of said first vehicle when said correctness value is above a predetermined threshold.

21. The system according to claim 9, further configured to send said vehicle information with said correctness value to other vehicles in the vicinity of said first vehicle.

* * * * *